(12) United States Patent
McNaughton

(10) Patent No.: US 7,673,660 B2
(45) Date of Patent: Mar. 9, 2010

(54) FILLING TUBES WITH CATALYST AND/OR OTHER PARTICULATE

(75) Inventor: Michael D. McNaughton, Seabrook, TX (US)

(73) Assignee: Catalyst Services, Inc., Deer Park, TX (US)

( * ) Notice: Subject to any disclaimer, the term of this patent is extended or adjusted under 35 U.S.C. 154(b) by 453 days.

(21) Appl. No.: 11/388,485

(22) Filed: Mar. 24, 2006

(65) Prior Publication Data

US 2006/0213575 A1 Sep. 28, 2006

Related U.S. Application Data

(60) Provisional application No. 60/665,413, filed on Mar. 25, 2005.

(51) Int. Cl.
*B67C 3/26* (2006.01)
(52) U.S. Cl. .................. 141/251; 414/180; 414/199
(58) Field of Classification Search ............... 141/267, 141/256, 12, 251, 258, 260, 286; 414/299–301, 414/160, 180, 199; 422/269
See application file for complete search history.

(56) References Cited

U.S. PATENT DOCUMENTS

| | | | |
|---|---|---|---|
| 639,540 A * | 12/1899 | Duncan | 422/269 |
| 1,802,089 A | 4/1931 | Pfeiffer | |
| 2,524,560 A | 10/1950 | Cote | |
| 4,077,530 A | 3/1978 | Fukusen et al. | |
| 4,176,997 A | 12/1979 | Hungerbach | |
| 4,321,738 A | 3/1982 | Makhijani | |
| 4,433,707 A | 2/1984 | Farnham | |
| 4,883,363 A | 11/1989 | Pillon et al. | |
| 5,080,873 A * | 1/1992 | Ono et al. | 117/213 |
| 5,082,414 A | 1/1992 | Taupin | |
| 5,113,918 A | 5/1992 | McGregor | |
| 5,147,612 A | 9/1992 | Raal | |
| 5,238,035 A | 8/1993 | Poussin et al. | |
| 5,247,970 A | 9/1993 | Ryntveit et al. | |
| 5,393,189 A * | 2/1995 | Berquist | 414/301 |
| 5,585,075 A | 12/1996 | Takano et al. | |
| 5,758,699 A | 6/1998 | Haquet et al. | |
| 5,906,229 A | 5/1999 | Haquet et al. | |
| 6,467,513 B1 | 10/2002 | Yanaru et al. | |
| 6,497,259 B1 | 12/2002 | Wegman | |
| 6,712,496 B2 | 3/2004 | Kressin et al. | |

(Continued)

FOREIGN PATENT DOCUMENTS

EP    A-1348649    1/2003

(Continued)

OTHER PUBLICATIONS

Mimmi Westman/Ek, International Search Report, Dec. 16, 2003, 2 pages, ISA/Swedish Patent Office, Sweden.

(Continued)

*Primary Examiner*—Timothy L Maust
*Assistant Examiner*—Jason K Niesz
(74) *Attorney, Agent, or Firm*—Mark A. Oathout

(57) ABSTRACT

Particulate filling devices and methods are disclosed that utilize a swivel connector, a mounting surface connected to the swiveling connector, and several obstacles mounted on the mounting surface. The obstacles are positioned consecutively to form a helix-pattern.

19 Claims, 3 Drawing Sheets

U.S. PATENT DOCUMENTS

| | | |
|---|---|---|
| 6,810,921 B2 | 11/2004 | Schlosser |
| 6,817,389 B2 | 11/2004 | Dovesi |
| 6,832,944 B2 | 12/2004 | Ostrow |
| 2003/0031536 A1 | 2/2003 | Boe et al. |
| 2004/0217039 A1 | 11/2004 | Jardin et al. |
| 2004/0233775 A1 | 11/2004 | van der Eerden et al. |

FOREIGN PATENT DOCUMENTS

| | | |
|---|---|---|
| EP | A-1283070 | 2/2003 |
| GB | A-468721 | 7/1937 |
| JP | 61106401 | 5/1986 |
| JP | 10296073 | 11/1998 |
| WO | WO 2004/028679 | 4/2004 |
| WO | WO 2004096428 | 11/2004 |

OTHER PUBLICATIONS

Blaine R. Copenheaver, International Search Report, Sep. 25, 2007, 3 pages, US Patent and Trademark Office, Patent Cooperation Treaty, Alexandria, US.

Blaine R. Copenheaver, Written Opinion of the International Searching Authority, Sep. 25, 2007, 4 pages, US Patent and Trademark Office, Patent Cooperation Treaty, Alexandria, US.

* cited by examiner

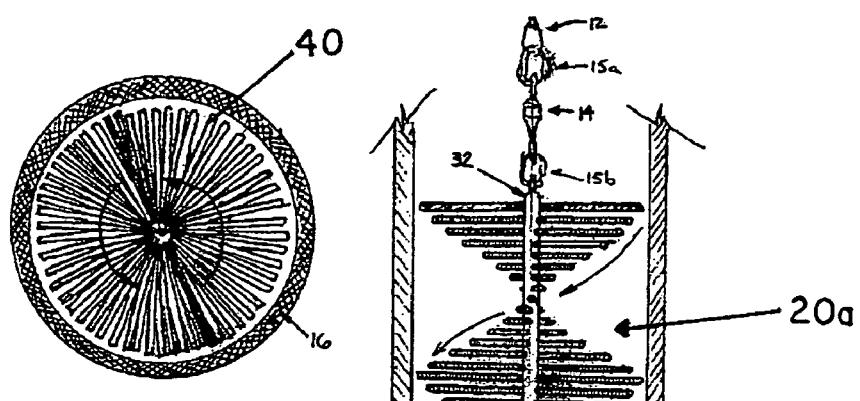
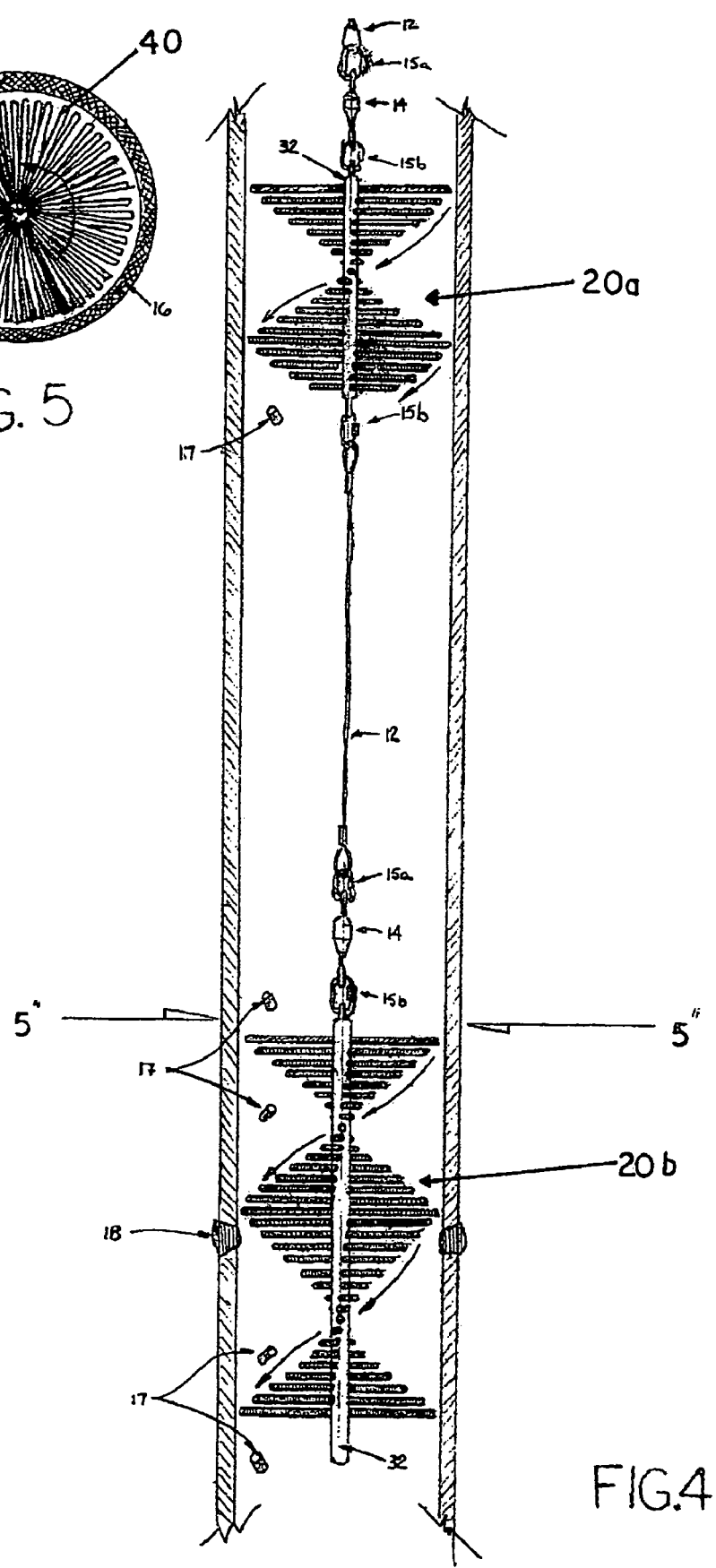
FIG. 5
FIG. 4

FILLING TUBES WITH CATALYST AND/OR OTHER PARTICULATE

CROSS-REFERENCE TO RELATED APPLICATIONS

This application claims the benefit of U.S. provisional application No. 60/665,413 filed Mar. 25, 2005.

FEDERALLY SPONSORED RESEARCH OR DEVELOPMENT

Not applicable.

REFERENCE TO LISTING, TABLES OR COMPACT DISK APPENDIX

Not applicable.

BACKGROUND

Catalyst is loaded into tubes within a reformer, heater or reactor vessel. The loading is a precursor to carrying out a reaction within such vessel. It is helpful to improve the efficiency of the loading process in order to improve the efficiency of the resulting reaction and to speed up the catalyst loading and clean-up processes.

SUMMARY

There are several objectives of the invention(s). A device and techniques are needed that can avoid becoming lodged on welds inside a tube. In certain cases weld impingement within a tube can be as great as five millimeters.

A device and techniques are needed that can work within a tube environment where the tube is not symmetrical (e.g. deformed and/or bent tube walls).

A device and techniques are needed that can inhibit or avoid altogether the fracture of catalyst or other particles. This problem is more acute with large radius catalyst or other particles having a greater mass, or particulate which may be more brittle.

A device and techniques are needed that can aid in the dislodging of the device in the event it does become 'stuck' within a tube.

A device and techniques are needed that can allow a vacuum hose to pass through or to pass outside the device (but within the tube) especially in small diameter tubes.

Particulate filling devices and methods are disclosed that use a swivel connector, a mounting surface connected to the swiveling connector, and several obstacles mounted on the mounting surface. The obstacles are positioned consecutively to form a helix-pattern.

As used below the term "helix-patterned" or "helix-pattern" means that the device is made up of individual obstruction/impediment members that have the figuration of a helix but that the obstruction members make a non-continuous surface as opposed to a continuous helical surface.

BRIEF DESCRIPTION OF THE DRAWINGS

FIG. 4 is a schematic elevational view of another embodiment with the tube shown in cross-section. FIG. 5 is a sectional view taken along line 5-5 of FIG. 4.

DETAILED DESCRIPTION OF THE PREFERRED EMBODIMENT(S)

Figure 1:
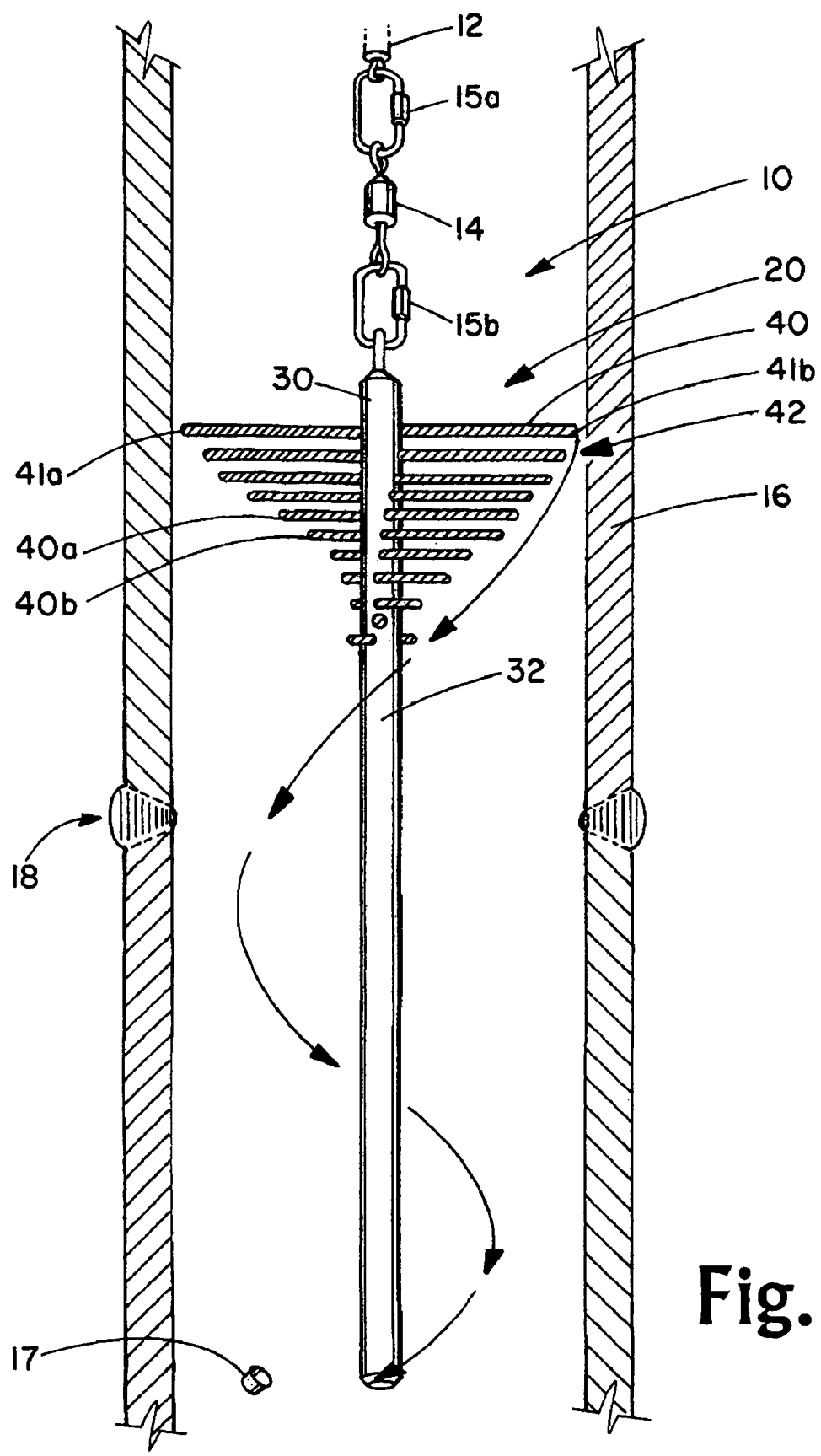
FIG. 1 is a schematic elevational view of one embodiment with the tube shown in cross-section with a spring arm.

A filling device 10 may be used with catalyst particulate 17 and other particulate matter. The filling device 10 generally includes a feed line 12, a swivel connector 14, and a helix-patterned filler 20. The helix-patterned filler 20 has a mounting surface 30 and a plurality of obstacles (arm like members) 40 mounted to the mounting surface 30. In mounting the plurality of obstacles 40 to the mounting surface 30, the obstacles 40 are positioned from top-to-bottom in a helix-pattern or stepped-helical pattern 42 around the mounting surface 30.

The filling device 10 is lowered into a tube 16 to fill the tube 16 with catalyst or other particulate 17. The tube 16 may have various regions of disuniformity such as, for example, regions of tube weld and weld impingement 18, bends in the tube (not shown), etc.

The feed line 12 is used to lower (e.g. slow controlled descent) the helix-patterned filler 20 into the tube 16 and to raise the helix-patterned filler 20 out of the tube 16 as the tube 16 is being filled. The helix-patterned filler 20 may be lowered and raised from the tube 16 by any known means or technique.

The filling device 10 preferably includes the swivel connector 14 (or any other known means for swiveling the helix-patterned filler 20). The swivel connector 14 may be connected at any desirable point along the feed line 12 and as shown is connected at the lower end. The swivel connector 14 may for example be a stainless steel swivel such as the type used on deep sea fishing lines. Stainless steel chain links 15a, 15b may be used to join the swivel connector 14 to the feed line 12, or to the feed line 12 and the helix-patterned filler 20. The swivel connector 14 allows the helix-patterned filler 20 to rotate without twisting the feed line 12 during a catalyst filling operation.

The mounting surface 30 is preferably a stainless steel rod 32 and functions as a vertical axis for the helix-patterned filler 20. In one embodiment, the rod 32 may have a sixteen millimeter diameter and be four-hundred-fifty millimeters long. The diameter and the length of the rod 32 as well as its mass may be changed according to the parameters of any particular catalyst particulate or other particulate loading task. The rod 32 may be hollow or a solid bar.

Each of the plurality of obstacles 40 are mounted perpendicular (or nearly perpendicular) to the axial (vertical) direction of the rod 32. They may be mounted, for example, by drilling a hole through the rod 32, next inserting an obstacle 40 through the rod 32 until both ends 41a,b protrude radially and equidistantly from the rod 32, and then fixing the obstacle 40 to the rod 32 with a set screw (not shown). The obstacles 40 may also be attached to the rod 32 at one end only, such that each obstacle 40 does not pass through the rod 32. Generally, the mounting holes or openings in the mounting surface 30 also appear in a helix-pattern around the mounting surface 30.

The plurality of obstacles 40 are positioned top to bottom in a helical pattern 42 (by way of example, a resilient stepped-helix pattern) around the rod 32. Each consecutive obstacles 40, for example obstacle 40a and obstacles 40b, are staggered from each other by a distance determined by the size/radius (and somewhat the mass and/or density) of the particulate. In other words the stagger distance (or gap) is a variable defined by the particulate, such distance being small enough to prevent catalyst or other particulate from falling through and getting caught between adjacent obstacles 40.

Figure 2:
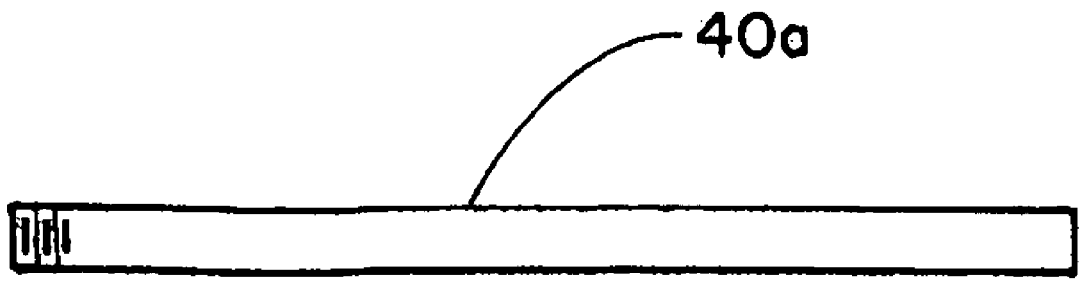
FIG. 2 is a side view of a solid arm.
Figure 3:
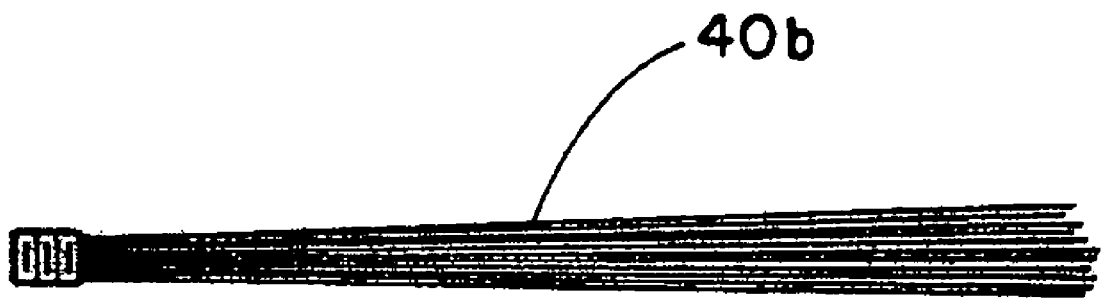
FIG. 3 is a side view of a brush arm.

Each obstacle 40 is preferably a coil spring made of stainless steel, is generally straight having stiffness sufficient to prevent, bias or impede particulate from falling through the obstacles 40. Hence, the stiffness is variable for each application and dependent upon the mass and/or density of the particulate. Other forms of obstacles 40, such as, for example, solid arms 40*a* (which may or may not be contoured) or brush arms 40*b* may be implemented (see FIGS. 2 and 3). The lengths of the obstacles 40 mounted on a particular rod 32 are all generally equal. Such length is dependent upon the inner diameter of the tube 16. For example, depending upon the catalyst it might be desirable to have a three to four millimeter clearance between the end of each obstacle 40 and the inner diameter of the tube 16. In one embodiment the obstacles 40 are each made of stainless steel having a 0.8 millimeter diameter and a length of three millimeters.

The flight of the helical-pattern 42 is preferably at an angle of about seventy-five degrees from the horizontal (but may be any angle on inclination greater that sixty-five degrees), has about three twists and directs particulate about four-hundred-fifty degrees downwardly-around the rod 32. Using a proper stagger distance, spring stiffness and flight, the particulate does not fall through the stairs, but travels down the helical steps (obstacles 40, See FIG. 5). Moreover, upon impact with the obstacles 40, the particulate will bounce down the obstacles 40 causing the helix-patterned filler 20 to rotate. The rotation helps to fill the tubes 16 with particulate in a more uniform manner.

The stepped-helical pattern 42 around the mounting surface 30 has generally been described as a pattern moving around a cylinder at a constant angle of inclination. However, a pattern moving around a cone could be used if needed to avoid lodging within a tube, or the pattern of the obstacles 40 could be changed such that the angle of inclination is not constant throughout the helix-patterned filler 20.

More than one helix-patterned filler 20*b* can be connected and stacked below another helix-patterned filler 20*a* (see FIG. 4), and each consecutively lower stack need not necessarily be of the same size.

The obstacles 40, if springs, are preferably coil springs although other resilient/pliable/flexible bumper devices could be used and/or the obstacles 40 could be positioned to form other than a downward helical stair (e.g. a switchback helical pattern [not shown] which may impart a different rotation).

The particulate 17 could be a particulate other than catalyst.

A working example for embodiments of a helix-patterned filler 20 design follows:

Several different versions of a filler device 10 the same or similar to as shown in the attached drawing were tested. First, a pitch on the flight of forty-five degrees was implemented. It was determined that the angle was not steep enough which allowed the catalyst to wedge in the flights 42. The pitch was increased until it was determined that the large diameter catalyst would not flow through/between the obstacles 40. This was at a sixty-five degree angle.

However, the normal sized catalyst continued to jam in the flight 42. At seventy-five degrees, all catalyst flowed smoothly through the flight 42. It was also at this angle that the greatest 'spin' of the flight 42 was determined as the catalyst passed down the filler 10 (approximately one revolution per second). By making the flight 42 from biasable or resilient obstacles 40 (e.g. stiff spring, a pliable solid or brush) a vacuum hose can pass through the filler 10 since the obstacles 40 would give way and the rod 32 can be pushed close to the tube wall 16. There is very little obstacle 40 loss during loading due to the angle of the flight 42 and numerous contacts through the filler device 10 (this differs from some prior systems, which have a near vertical orientation and therefore must absorb more of the energy of the catalyst) and hence, the filler device 10 slows the catalyst by the numerous contacts along the flight 42 which forces it to spin. Since the flight 42 is made from a pliable obstacle 40 and the swivel 14 is joined to the line/rope, there are no solid vertical members for the catalyst to strike.

What is claimed is:

1. A particulate filling apparatus to be lowered and raised within a tube for filling the tube with the particulate, comprising:

a feed line supporting the particulate filling apparatus to be lowered and raised within the tube;

a means for swiveling the particulate filling apparatus connected to the feed line;

a mounting surface connected to said swiveling means;

a plurality of obstacles mounted on the mounting surface positioned top to bottom consecutively to form a flight having a helix-pattern; and wherein each of the plurality of obstacles mounted on the mounting surface positioned top to bottom consecutively to form said flight having said helix-pattern further comprises positioning each consecutive obstacle to define a gap width between each consecutive obstacle which is less than a diameter of a particulate to be used with the particulate filling apparatus.

2. The apparatus according to claim 1, wherein the mounting surface is connected below said swiveling means.

3. The apparatus according to claim 1, wherein said plurality of obstacles comprises a plurality of stainless steel coil springs.

4. The apparatus according to claim 1, wherein said plurality of obstacles comprises a plurality of solid arms.

5. The apparatus according to claim 1, wherein said plurality of obstacles comprises a plurality of stainless steel brush arms.

6. The apparatus according to claim 1, wherein the plurality of obstacles comprises at least two different types of obstacles selected from the group of obstacles consisting of stainless steel coil springs, carbon steel coil springs, stainless steel solid arms, carbon steel solid arms, plastic solid arms, stainless steel brush arms, carbon steel brush arms, and plastic brush arms.

7. The apparatus according to claim 1, wherein the mounting surface comprises a stainless steel rod.

8. The apparatus according to claim 7, wherein the stainless steel rod is hollow.

9. The apparatus according to claim 1, wherein each of the plurality of obstacles passes through the mounting surface.

10. The apparatus according to claim 1, wherein each of the plurality of obstacles is attached at one end to the mounting surface.

11. The apparatus according to claim 1, wherein each of the plurality of obstacles mounted on the mounting surface positioned top to bottom consecutively to form said flight having said helix-pattern further comprises said helix-pattern having said flight of obstacles at an angle of inclination greater than or equal to about seventy-five degrees.

12. The apparatus according to claim 11, wherein said flight of obstacles directs a particulate about four-hundred-and-fifty degrees around the mounting surface.

13. The apparatus according to claim 11, wherein said flight of obstacles includes a second angle of inclination greater than or equal to about seventy-five degrees wherein the second angle of inclination is different than the first angle of inclination.

14. The apparatus according to claim 1, further comprising a second particulate filling apparatus connected below said particulate filling apparatus.

15. A particulate filling apparatus to be lowered and raised within a tube for filling the tube with the particulate, comprising:
- a feed line supporting the particulate filling apparatus to be lowered and raised within the tube;
- a means for swiveling the particulate filling apparatus connected to the feed line;
- a stainless steel rod connected below said swiveling means;
- a plurality of stainless steel obstacles mounted horizontally from the stainless steel rod positioned top to bottom consecutively to form a flight having a helix-pattern;
- wherein each of the plurality of obstacles mounted on the stainless steel rod positioned top to bottom consecutively to form said flight having said helix-pattern further comprises positioning each consecutive obstacle to define a gap width between each consecutive obstacle which is less than a diameter of a particulate to be used with the particulate filling apparatus; and
- wherein each of the plurality of obstacles mounted on the stainless steel rod is positioned top to bottom consecutively to form said flight having said helix-pattern further comprises said helix-pattern having said flight of obstacles at an angle of inclination greater than or equal to about seventy-five degrees.

16. A method for filling a particulate into a container, comprising:
- lowering a filling device into a tube to be filled with the particulate;
- dropping the particulate over the filling device;
- stair-stepping the particulate downwardly-around the filling device wherein the particulate is traveling in a helix-pattern by mounting a plurality of obstacles on a mounting surface positioned top to bottom consecutively to form a flight having the helix-pattern and by positioning each consecutive obstacle to define a gap width between each consecutive obstacle which is less than a diameter of a particulate to be used with the particulate filling apparatus;
- swiveling the filling device via said steps of dropping and stair-stepping the particulate downwardly-around the filling device by impacting the filling device;
- filling the tube in a uniform manner via the particulate traveling from the lower end of the filling device according to said steps of stair-stepping the particulate downwardly-around and swiveling the filling device; and
- raising the filling device out of the tube as the tube is filled with the particulate.

17. The method according to claim 16 wherein said step of stair-stepping the particulate downwardly-around the filling device wherein the particulate is traveling in a helix-pattern is carried out at an angle of inclination greater than or equal to about seventy-five degrees.

18. The method according to claim 16 wherein said step of stair-stepping the particulate downwardly-around the filling device comprises impeding the flow of the particulate with biasing obstacles.

19. The apparatus according to claim 1, wherein said means for swiveling the particulate filling apparatus comprises a swivel.

* * * * *